Patented Oct. 21, 1941

2,260,254

UNITED STATES PATENT OFFICE 2,260,254

PROCESS OF MAKING SOYBEAN PRODUCTS

Norman F. Kruse, Decatur, and Weldon L. Soldner, Berne, Ind., assignors to Central Soya Company, Inc., Fort Wayne, Ind., a corporation of Indiana No Drawing. Application January 22, 1940, Serial No. 315,030

8 Claims. (Cl. 99—98)

It is the object of our invention to produce a granular, dust-free, pleasant-tasting, and highly nutritive food product from solvent-extracted soybean oil meal; and one that not only is suitable as food for animals, birds, and fish, but also is desirable and attractive as food for humans.

When soybeans, crushed and/or flaked, are subjected to solvent extraction to obtain the oil which they contain, the residue remaining after the extraction is unpalatable, because of its bitterness, and is relatively low in nutritive value. This is the solvent-extracted soybean oil meal.

Many attempts have been made to make this solvent-extracted soybean oil meal attractive and palatable, by removing its bitter taste, and to increase its nutritional value. Generally speaking, however, those attempts have heretofore left much to be desired.

It is known that the nutritional value may be raised somewhat by subjecting solvent-extracted soybean oil meal for a period of time to a temperature higher than the boiling point of water; and that thereby the nutritional efficiency may be made comparable to that of hydraulic and expeller produced soybean oil meal. (See "The Nutritional Value of Soybean Oil Meal Prepared by Different Methods of Oil Extraction," by J. W. Hayward, Oil and Soap, Volume 14, pages 317–321, 1937.) In the past, however, the debittering of the meal and the raising of the nutritional value have been obtained at relatively low moisture content, below 12% and sometimes as low as 4½% to 7%, and the heating has sometimes been done under relatively high pressure, as of the order of 2000 to 5000 pounds per square inch. (Levinson & Dickinson, Patent No. 2,162,729, of June 20, 1939.) The product produced by prior treatments, even with a moisture content of the meal as high as 12%, has not been satisfactory; for while it has resulted in an increase in nutritive value, the product has been dry, friable, chalky in appearance, dusty, low in specific gravity, and often disagreeable in flavor.

We have discovered the surprising fact that if we raise the moisture content of the solvent-extracted soybean oil meal to an abnormal high value, of at least 15%, and then subject the wet meal to heating or cooking at a temperature somewhat above the boiling point of water, we not only obtain the desired improvement in nutritive value, but obtain a granular (not dusty) product of rather high specific gravity and of a desirable sweet nut-like flavor and attractive appearance instead of the unpalatable and unattractive product heretofore known.

In carrying out our invention, the solvent-extracted soybean oil meal is obtained by removing the oil from soybeans in any usual or convenient manner of solvent extraction. As examples, one suitable solvent is hexane, and another is a mixture of benzene and alcohol. The solvent is used to extract the crushed and/or flaked soybeans, to produce the solvent-extracted soybean oil meal. The residue remaining after removal of the solvent, as by distillation followed by steaming, is the raw product from which we start. This raw product has a moisture content of not to exceed 5% to 12%, and an oil content of less than 2%.

We raise that moisture content of the solvent-extracted soybean oil meal to an abnormal high value, of at least 15%, preferably not above 30%, and most desirably between 17% and 25%. This raising of the moisture content may be done in any convenient manner, but most conveniently by agitating the meal and spraying it with either hot or cold water.

The wet meal, with the raised moisture content of at least 15% but still meal and not dough, is then subjected to heating or cooking, at a temperature definitely above the boiling point of water but not above about 300° F. A desirable top temperature in this heating or cooking operation is between 225° and 265° F. This heating may be done in any convenient cooking apparatus, such for instance as a cottonseed cooker or a steam tube drier, either of which may be the atmospheric type or the vacuum type or the pressure type, preferably one in which the heat may be applied through a heating-fluid jacket, or through heating-fluid coils immersed in the meal (possible because the meal is still meal and is not dough), or both. The cooking is desirably and most conveniently done at atmospheric pressure, by permitting the free escape of any steam or other vapors which may be produced in the heating; but higher or lower pressures are sometimes desirable. By raising the pressure the cooking time is shortened and a greater coloration is obtained, and vice versa. During the heating, there is very definite internal steaming in the meal. In the course of the heating, and of the internal steaming, a modification occurs of the proteins (which modification proceeds the more rapidly under the highly humid conditions), and the carbohydrate substances present hydrolyze to simpler and better-flavored sugars, and the material granulates to form rounded granular particles, and to some extent the sugars caramelize, and the color becomes a deeper yellow or brown. If hulls or other cellulose materials are present, as is commonly the case, they are not markedly affected, and are sometimes included but frequently are not included in the granular particles which are formed. The color of the particles varies in depth according to the temperature, pressure, and time of the cooking. If desired, these actions may be both accelerated and increased in amount by supplementing the indirect heat from the jacket or the coils through the application of direct steam into the mass of the meal. The heating or cooking is continued until the moisture content, which was deliberately made abnormally high at the start, is reduced to any desired value below 13%; which usually takes from 30 to 90 minutes. It is during this time that the actions above described take place. The extent of the reduction in the moisture content depends on the time, pressure, and temperature used, but in any case is to a value less than 13%.

It is desirable to keep the meal in motion during the cooking, as by stirring if the vessel is a stationary one, or by tumbling if it is a rotating one such as a drum.

After the desired cooking has been obtained, the meal is suitably cooled. The cooled meal is mainly of the desired granular character, and is substantially dust-free. By "dust" we mean material that will pass through a 100-mesh screen; and by "substantially dust-free" we mean that there is not present as free material more than 2% of such dust. Some hulls are co-present if they were present in the original meal; but any hulls are easily removable from the final product, if desired, as by aspirating. The grains are rounded, of varying size, and of a definite rather hard structure that is dry and highly non-friable (not easily reduced to a powder). The product has a sweet nut-like flavor, a bright yellowish-brown appearance, a high nutritive value, and an oil content of less than 2%. If grains of definite size are desired, these may be obtained by the usual sorting screens. The product is suitable not only as food for live stock and other animals, such as dogs, and for birds and for fish, but also as a food for human beings; as for cereals, breakfast foods, toppings of various sorts, soups, etc.

We believe that the improvement in the product is attributable to a complex series of reactions that occur under the high-moisture heating, and that affect both the carbohydrates and the proteins which are present, with the production of simpler carbohydrates and then partial caramelization, and with modification of the original proteins.

We claim as our invention:

1. The process of preparing a food product from solvent-extracted soybean oil meal, which consists in increasing the moisture content of such solvent-extracted soybean oil meal to a value in excess of 15% and not in excess of 30%, while leaving the meal still in the form of meal as distinguished from dough and then cooking the high-moisture meal at a temperature above the boiling point of water and keeping the meal in motion during such cooking.

2. The process of preparing a food product from solvent-extracted soybean oil meal, which consists in increasing the moisture content of such solvent-extracted soybean oil meal to a value in excess of 15%, while leaving the meal still in the form of meal as distinguished from dough and then cooking the high-moisture meal at a temperature above the boiling point of water and keeping the meal in motion during such cooking.

3. The process of preparing a food product from solvent-extracted soybean oil meal, which consists in increasing the moisture content of such solvent-extracted soybean oil meal to a value in excess of 15% and not in excess of 30%, while leaving the meal still in the form of meal as distinguished from dough and then cooking the high-moisture meal at a temperature above the boiling point of water but not above 300° F. and keeping the meal in motion during such cooking.

4. The process of preparing a food product from solvent-extracted soybean oil meal, which consists in increasing the moisture content of such solvent-extracted soybean oil meal to a value in excess of 15%, while leaving the meal still in the form of meal as distinguished from dough and then cooking the high-moisture meal at a temperature above the boiling point of water but not above 300° F. and keeping the meal in motion during such cooking.

5. The process of preparing a food product from solvent-extracted soybean oil meal, which consists in increasing the moisture content of such solvent-extracted soybean oil meal to a value in excess of 15% and not in excess of 30%, while leaving the meal still in the form of meal as distinguished from dough and then cooking the high-moisture meal at a temperature above the boiling point of water at substantially atmospheric pressure and keeping the meal in motion during such cooking.

6. The process of preparing a food product from solvent-extracted soybean oil meal, which consists in increasing the moisture content of such solvent-extracted soybean oil meal to a value in excess of 15%, while leaving the meal still in the form of meal as distinguished from dough and then cooking the high-moisture meal at a temperature above the boiling point of water at substantially atmospheric pressure and keeping the meal in motion during such cooking.

7. The process of preparing a food product from solvent-extracted soybean oil meal, which consists in increasing the moisture content of such solvent-extracted soybean oil meal to a value in excess of 15% and not in excess of 30%, while leaving the meal still in the form of meal as distinguished from dough and then cooking the high-moisture meal at a temperature above the boiling point of water until the moisture content is reduced below 13% and keeping the meal in motion during such cooking.

8. The process of preparing a food product from solvent-extracted soybean oil meal, which consists in increasing the moisture content of such solvent-extracted soybean oil meal to a value in excess of 15%, while leaving the meal still in the form of meal as distinguished from dough and then cooking the high-moisture meal at a temperature above the boiling point of water until the moisture content is reduced below 13% and keeping the meal in motion during such cooking.

NORMAN F. KRUSE.
WELDON L. SOLDNER.